Sept. 22, 1925. 1,554,547
H. BAZIN ET AL
CONTINUOUS GLASS DRAWING DEVICE
Filed Oct. 12, 1923   3 Sheets-Sheet 3
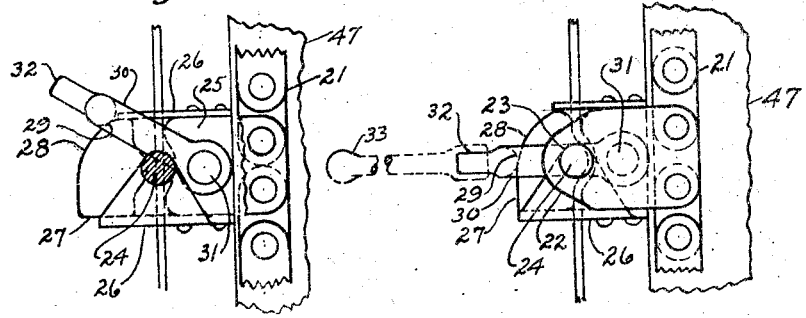
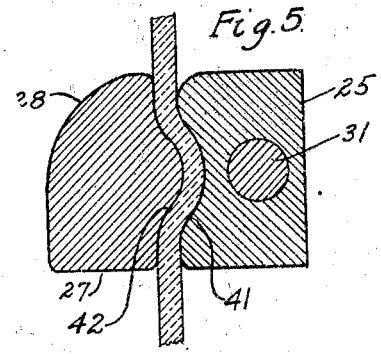
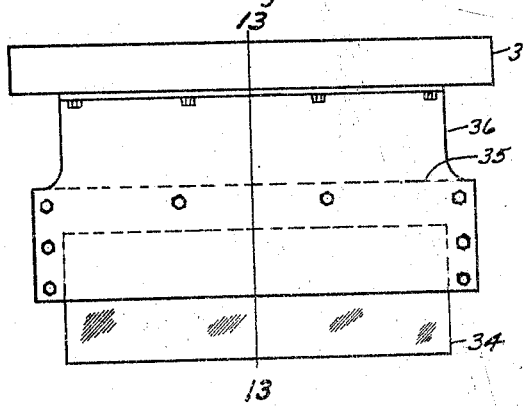
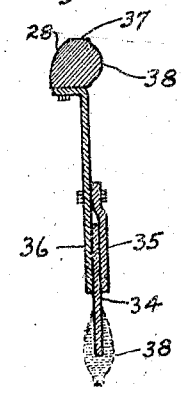
INVENTOR.
Hector Bazin and
Arsene Bayle
BY
Geo. B. Ingersoll
ATTORNEY.

Patented Sept. 22, 1925.

1,554,547

UNITED STATES PATENT OFFICE.

HECTOR BAZIN AND ARSENE BAYLE, OF DETROIT, MICHIGAN.

CONTINUOUS-GLASS-DRAWING DEVICE.

Application filed October 12, 1923. Serial No. 668,226.

*To all whom it may concern:*

Be it known that we, HECTOR BAZIN and ARSENE BAYLE, citizens of the United States, residing at Detroit, in the county of Wayne and State of Michigan, have invented a new and Improved Continuous-Glass-Drawing Device, of which the following is a specification.

Our invention relates to the art of glass making and concerns itself with a process and with a machine or apparatus for carrying out said process.

The object of our invention is to produce a process and apparatus by means of which glass sheets may be continuously drawn from a mass of molten glass in such a way that the sheets, after being gripped for drawing, are continuously conveyed vertically and horizontally away to an unloading point, without any additional part of the apparatus again touching the drawn sheets. A further object of our invention is to provide for the continuous drawing of glass sheets which will be preserved smooth, uniform and sufficiently flawless as to eliminate the further grinding and finishing of the main surfaces of such sheets.

Figure 1:
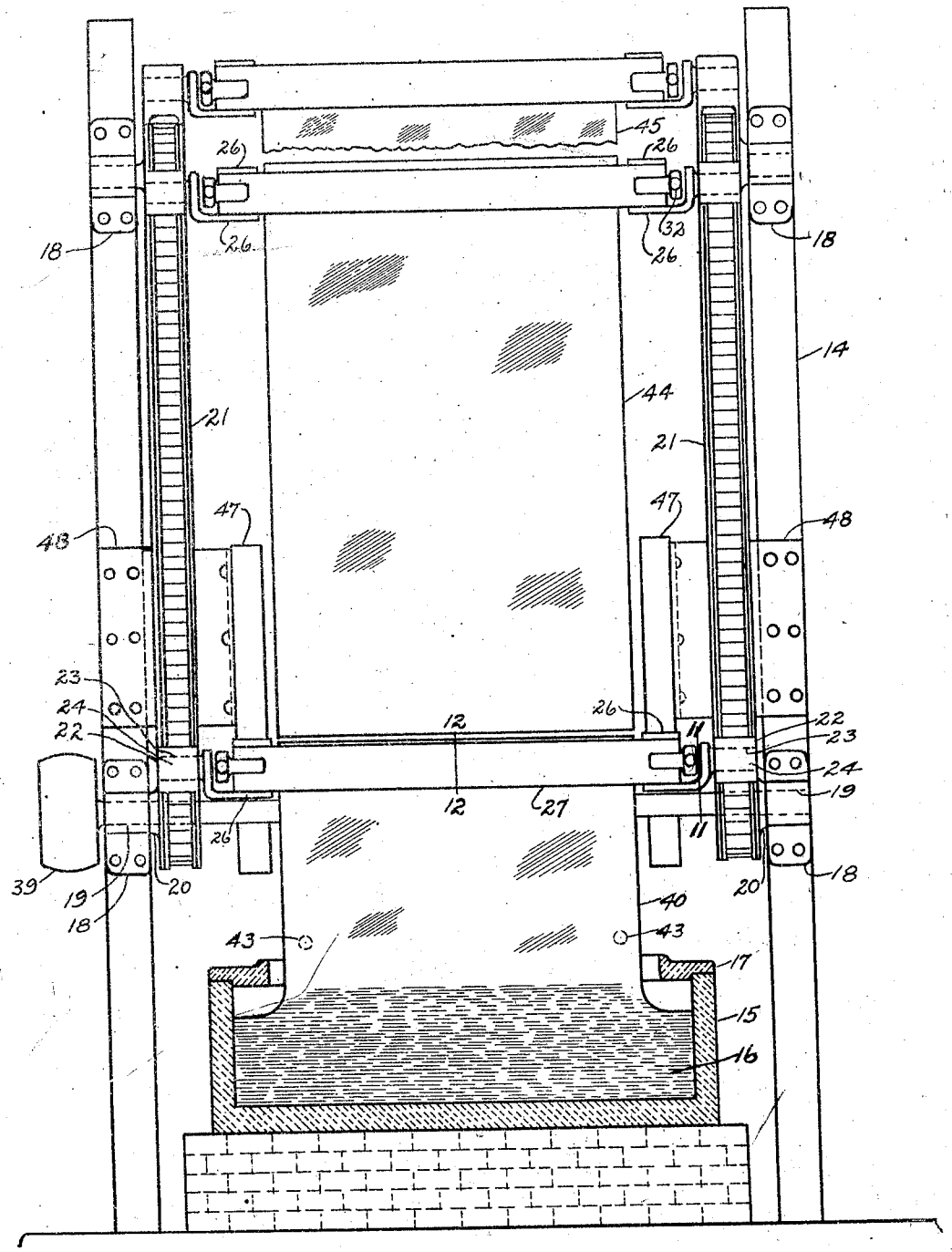
Figure 2:
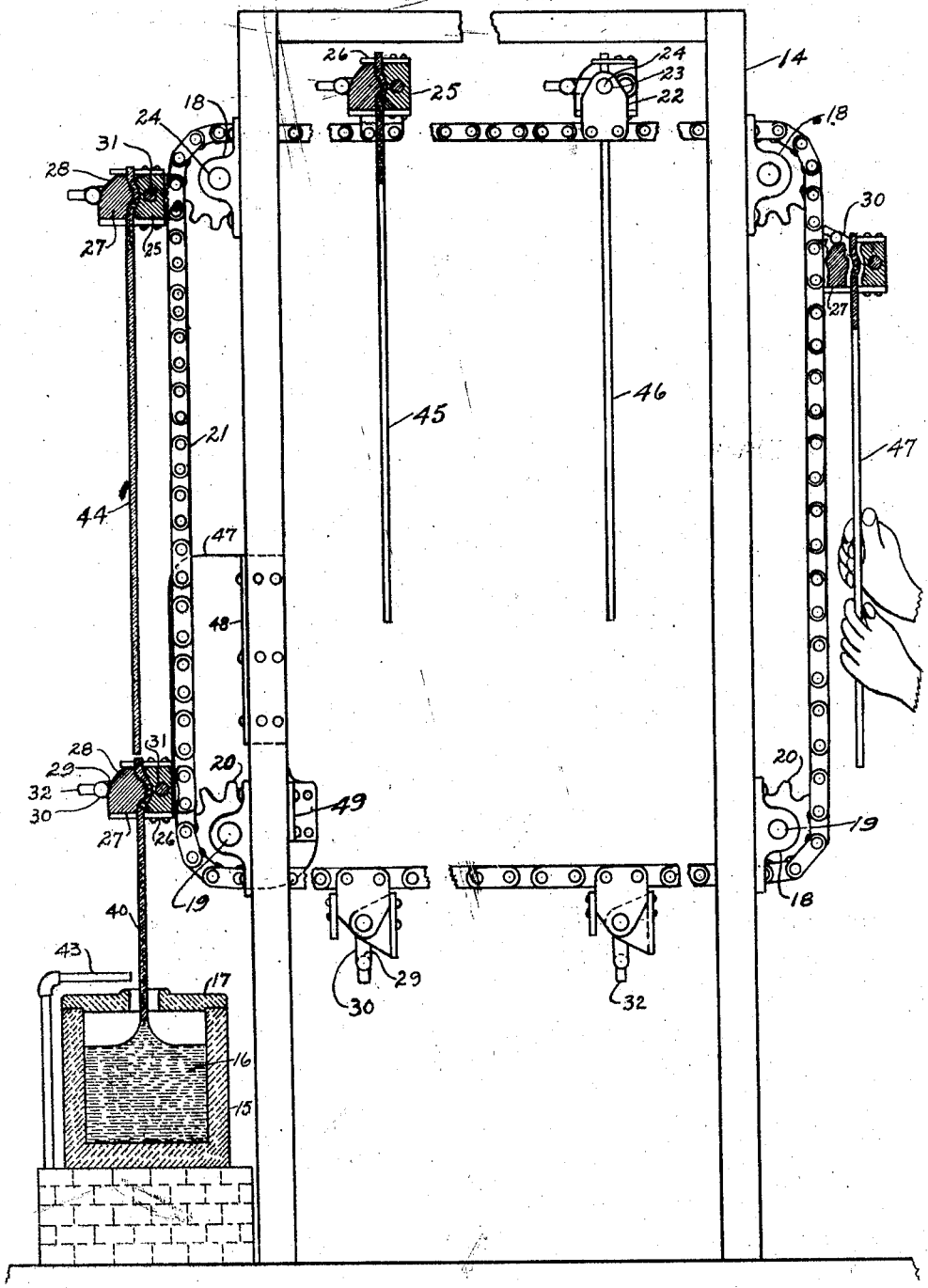

In the accompanying drawings, Fig. 1 is a front elevation of a machine constructed in accordance with our invention and showing same in its operation of continuously drawing glass sheets from a glass pot, said glass pot and contents being shown in section. Fig. 2 is a side elevation of said machine showing certain parts in section and with certain parts broken and removed to more clearly show the complete operation of our continuous glass sheet drawing machine. Fig. 3 is an enlarged fragmentary side view of the drawing and conveying chain with a sectional view of the glass sheet gripping mechanism taken on line 11—11 in Fig. 1. Fig. 4 is an enlarged view of the drawing and conveying chain with its glass sheet drawing mechanism shown in full and attached to said chain. Fig. 5 is an enlarged sectional view of the glass gripping mechanism taken on line 12—12 of Fig. 1. Fig. 6 is a front elevation of the glass bait and holder used in our machine for the initial or starting draw which begins the continuous drawing operation. Fig. 7 is a sectional view of the glass bait and glass bait holder taken on line 13—13 of Fig. 6.

Referring more specifically to the accompanying drawings in which like numerals refer to like parts in all the figures, the operating parts of our machine are mounted and supported on a suitable frame structure 14 suitably located adjacent to a crucible 15 adapted to hold the molten glass 16 from which the glass sheets are drawn. Crucible 15 is provided with a suitable cover 17 to increase the heat retaining efficiency of the crucible 15, said cover being provided with an opening through which the glass sheets are drawn. To the frame structure 14 are suitably attached journal brackets 18 which carry shafts 19 to which are attached carrier sprockets or wheels 20 over which operate endless carriers or chains 21.

At suitable intervals on carrier or chain 21 are suitably fastened brackets 22 which are constructed with a journal or bearing 23, the center of said journal or bearing is located on or near a perpendicular plane through the center of the glass sheet as viewed from its edge elevation during the glass drawing operation.

Operating in the journals or bearings 23 in brackets 22, are shafts 24 which are suitably fastened to or integral with bars 25 which extend across the glass sheet drawing machine. Bar 25 has a female recess or depression in one of its faces which in its continuous travel always returns to a position adjacent to the glass sheet being drawn. On the upper and lower sides at each end of bars 25 and projecting out in such suitable manner as to form ledges or shelves are plates or extensions 26 so located and arranged as not to obstruct the drawing of the sheets.

One of the plates 26 may be constructed to carry or form the extension shafts 24 at each side of sheets. At 27 is shown a bar which has a projecting male portion or surface. Bar 27 is arranged to suitably fit between projecting plates 26 carried on bar 25. Bar 27 at each end also has a thrust receiving surface 28, which contacts with a thrust surface 29 on lever 30. Lever 30 is suitably fastened to a shaft 31, which operates in a bearing in bar 25. Shaft 31 extends from one side of the glass sheet to the other by passing through bar 25 to which, at each end is suitably fastened levers 30.

It is to be noted that brackets 22 are so suitably fastened to carrier or chain 21 as to form an integral part of said carrier or chain. This is accomplished by making the brackets 22 carry certain portions of the roller mechanism of the carrier or chains 21, Lever 30 may be so provided with a suitable extension 32 as to form a handle or a projection over which a handle 33, as shown by dotted lines in Fig. 4, may be used for the purpose of gaining additional leverages for the operation of bars 25 and 27.

In Figures 6 and 7 is shown a glass bait made by suitably clamping or fastening a glass sheet 34 between plates 35 and 36. Plate 36 is suitably fastened to a bar 37, which has at each end thrust receiving surfaces 28 and a projecting male surface 38. Thrust receiving surfaces 28 are identical on bars 27 and 37 thus permitting interchangeability with levers 30 and plates 26. It is to be noted that the projecting male surface 38 is made to contact directly with female surface on bars 25 thus permitting of bar 37 interchanging with bars 27 when no glass is interposed between said bars as at the time of the drawing operation.

The glass bait as shown in Figures 6 and 7 is used for the drawing of the first sheet of glass which starts the operation of the continuous drawing of the glass sheets. The use of the glass bait is accomplished by placing bar 37, with its attached parts, in the position of bar 27 in Figs. 1, 2, 3 and 4 and locking same by forcing lever 30 and its thrust face 29 into contact with thrust receiving surfaces 28 on bars 37. Suitable operation of carriers or chains 21 will permit of lowering the glass bait 34 into the moulten glass 16 which will adhere to said glass bait 34 as shown by dotted lines 38 in Fig. 7 and allow the drawing and conveying carriers or chains 21 to be set in motion and the drawing operation started. At 39 is shown a power driven pulley suitably fastened to shafts 19 which shafts may extend across the machine to convey the driving or operating power from one delivery point to any or all conveying or drawing carriers or chains. It is to be noted that the glass bait bar 37 is used only to start the operation of continuous drawing and after starting is replaced by bars 27.

Figures 1 and 2 show our sheet glass drawing machine in its operation after its start is accomplished by means of the glass bait as above described and after the said glass bait has been replaced by operating bars 27. As the new glass sheet 40 is drawn upwards from the mass of molten glass 16 in crucible 15, bar 25 being fastened to carrier or chain 21, is continuously conducted to a position adjacent to the continuously conducted glass sheet 40 as shown in Fig. 3. The machine operator now takes one of the disassembled bars 27 and places it in a supported position between ledges or extensions 26, approximately as shown in Fig. 3, in which position the glass sheet 40 and bars 25 and 27 are being continuously conducted in a vertical direction, then by forcing lever 30 and its thrust face 29 into contact with thrust receiving surfaces 28 on bars 27, bar 27 is moved to the positions shown in Figures 4 and 5.

The forced sliding of bar 27 is accomplished while the glass sheet 40 is in such close proximity to the molten glass 16 that it is still partially heated and of a plastic composition thus allowing the glass sheet to be compressed or clamped between the female concave surface 41 on bar 25 and the male or convex surface 42 on bar 27 as shown in Fig. 5, and so gripping the glass sheet 40 as to enable the conveying or drawing mechanism to exert an upward pull or draw through the said bars 25 and 27 without interrupting the conveying or drawing motion of the machine. The partially heated plastic condition of the glass is more efficiently maintained by suitable fuel burners 43 being suitably placed as shown in Fig. 2, and indicated by dotted lines in Fig. 1.

After the glass sheet 40 is securely clamped in a drawing position between bars 25 and 27, a glass cutting tool or device is suitably operated across the face or faces of the continuously moving glass sheet thus sufficiently cutting or notching the glass sheet so as to completely or partially sever same just above the clamping bars 25 and 27. In case the sheet is partially severed, the severance will be completed as the sheet is conveyed from a vertical to a horizontal direction of motion.

In Figures 1 and 2 the glass sheet 44 is shown, just after being severed from its following drawn sheet 40, and about to be conveyed from a vertical to a horizontal travelling motion as indicated by drawn glass sheets 45 and 46. Drawn sheet 47 is shown, after having been conveyed from the drawing of the machine, in its removal position, said removal being suitably accomplished by releasing lever 30 and clamp bar 27. It is to be noted that the travelling motion from a vertical to a horizontal direction is accomplished by means of the shafts 24 being fastened to bars 25 and said shafts being free to trunnion or swivel in the journals 23 in brackets 22, thus allowing the glass sheets to always remain in a vertically conveyed position as shown by sheets 44, 45 and 46. To more efficiently accomplish the maintenance of the drawn glass sheet, in a continuous vertical position, the swivelling unit should be statically balanced in a suitable position.

It is to be understood that a suitable number of carrier sprockets or wheels 20 may be fastened to the frame structure as to efficiently support the endless chains or carriers 21 and their supported loads. Also in order to more efficiently draw the glass free from defects, suitable guides may be placed adjacent to the conveying chains or carriers 21 in such a way as to steady, in any and all directions, the travelling motion of said chains or carriers and their supported loads.

In Fig. 1 on each side of the glass sheets are the guides 47 suitably supported from frame 14 by means of brackets 48 and 49. The guides 47 are so suitably located that the rear face of bar 25 slides in contact with said guides 47 in such manner as to cause bars 25 and their attached parts to assume the position shown in Fig. 3 in their continuous travel. This position of bar 25 adjacent to glass sheet 40, is thus accomplished without injury to the glass sheet 40 from the swivel or trunnion motion of the clamping bars and the attaching handles etc. Guides 47 also serve as a thrust block when bar 27 is placed and locked in a position as shown in Figures 4 and 5. It is to be further understood that we do not limit ourselves to the particular design or construction, which we have herein shown and described, as many changes may be made in the matter of constructing, attaching and assembling the various parts of our device without departing from the spirit and scope of our invention as defined in the appended claims.

We claim:—

1. A glass sheet drawing machine, provided with endless carriers, a frame for supporting the said endless carriers, bearing brackets suitably attached to the said endless carriers, a glass sheet clamping device adapted to swivel in the said bearing brackets, and blocks attached to the said frame, the said blocks contacting with and guiding the said glass sheet clamping device to a position adjacent the glass sheet without deflecting the said glass sheet from its drawing position.

2. A glass sheet drawing machine, provided with endless carriers, bearing brackets suitably attached to the said endless carriers, glass sheet clamping bars adapted to swivel in the said bearing brackets, levers for actuating the said clamping bars, the said levers having projections for supporting a removable lever extension, and a removable lever extension.

3. In a glass sheet drawing machine, the combination of a supporting frame, endless carriers, journal brackets suitably attached to the said carriers, a permanently attached clamping bar having a concave glass gripping face, said permanently attached clamping bar being pivotally mounted in said journal brackets and having projecting supporting surfaces at each of its ends, a removable clamping bar having a convex gripping face, and a convex surface at each of its ends, said removable clamping bar being adapted to be supported and guided by the projecting surfaces on the said permanently attached clamping bar, levers having convex surfaces contacting with the convex surfaces on the said removable clamping bar, the said levers being suitably mounted on the said permanently attached clamping bar, and guide blocks, the said guide blocks being suitably mounted on the said frame, and adapted to contact with and guide the said permanently attached clamping bar to a position adjacent the glass sheet.

HECTOR BAZIN.
ARSENE BAYLE.